(12) United States Patent
Yang

(10) Patent No.: US 9,398,043 B1
(45) Date of Patent: Jul. 19, 2016

(54) APPLYING FINE-GRAIN POLICY ACTION TO ENCAPSULATED NETWORK ATTACKS

(75) Inventor: Siying Yang, Burlingame, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2131 days.

(21) Appl. No.: 12/409,634

(22) Filed: Mar. 24, 2009

(51) Int. Cl.
H04L 29/06 (2006.01)

(52) U.S. Cl.
CPC .................................. *H04L 63/1441* (2013.01)

(58) Field of Classification Search
CPC ..... H04L 63/00; H04L 63/02; H04L 63/0227; H04L 63/0254; H04L 63/12; H04L 63/126; H04L 63/14; H04L 63/1408; H04L 63/1441
USPC ......... 726/22–23, 26; 713/153–154; 709/230, 709/236, 246; 370/229–231, 235, 431–433, 370/464, 474
See application file for complete search history.

(56) References Cited

U.S. PATENT DOCUMENTS

| | | | | |
|---|---|---|---|---|
| 5,598,535 | A * | 1/1997 | Brech et al. | 709/230 |
| 5,884,025 | A * | 3/1999 | Baehr et al. | 726/13 |
| 5,960,452 | A * | 9/1999 | Chi | 711/117 |
| 5,960,458 | A | 9/1999 | Kametani | |
| 6,147,976 | A * | 11/2000 | Shand et al. | 370/254 |
| 6,438,723 | B1 * | 8/2002 | Kalliojarvi | 714/751 |
| 6,697,381 | B1 * | 2/2004 | Talbot et al. | 370/470 |
| 6,826,694 | B1 | 11/2004 | Dutta et al. | |
| 6,854,063 | B1 | 2/2005 | Qu et al. | |
| 6,940,863 | B2 * | 9/2005 | Xue et al. | 370/401 |
| 6,963,564 | B1 * | 11/2005 | Liu | 370/389 |
| 6,973,055 | B1 | 12/2005 | Du | |
| 7,272,646 | B2 | 9/2007 | Cooper et al. | |
| 7,337,214 | B2 | 2/2008 | Douglass et al. | |

(Continued)

FOREIGN PATENT DOCUMENTS

| | | |
|---|---|---|
| CN | 101056306 A | 10/2007 |
| CN | 101119321 A | 2/2008 |
| EP | 1049294 A2 * | 11/2000 |

OTHER PUBLICATIONS

Office Action from U.S. Appl. No. 11/937,163, dated Nov. 9, 2010, 15 pp.

(Continued)

*Primary Examiner* — Eric W Shepperd
(74) *Attorney, Agent, or Firm* — Shumaker & Sieffert, P.A.

(57) ABSTRACT

An intrusion detection system inspects encapsulated packet flows and, upon detecting a malicious encapsulated packet flow, may close an encapsulated network session corresponding to the malicious flow or drop sub-packets of the malicious flow without acting against non-malicious sub-packets and/or sessions. In one example, a network device includes a flow analysis module that receives a packet flow packets, each packet comprising a packet header and one or more sub-packets each corresponding to respective network sessions, an attack detection module that identifies at least one of the network sessions as a malicious network session, a policy action module that executes a policy action on the sub-packet corresponding to the malicious network session based on the identification of the malicious network session, and a forwarding component that forms a reconstructed packet comprising the packet header and the sub-packets excluding the sub-packet corresponding to the malicious network session and forwards the reconstructed packet.

30 Claims, 8 Drawing Sheets

(56) References Cited

U.S. PATENT DOCUMENTS

| | | | |
|---|---|---|---|
| 7,383,438 | B2 | 6/2008 | Fahrny et al. |
| 7,454,792 | B2 | 11/2008 | Cantrell et al. |
| 7,463,590 | B2 | 12/2008 | Mualem et al. |
| 7,467,202 | B2 | 12/2008 | Savchuk |
| 7,496,962 | B2 | 2/2009 | Roelker et al. |
| 7,624,444 | B2 | 11/2009 | Gupta et al. |
| 7,725,558 | B2 | 5/2010 | Dickenson |
| 7,747,874 | B2* | 6/2010 | Goodwill et al. ............ 713/193 |
| 7,830,864 | B2* | 11/2010 | Li ................................. 370/352 |
| 7,844,700 | B2 | 11/2010 | Marinescu et al. |
| 7,890,612 | B2 | 2/2011 | Todd et al. |
| 7,945,948 | B2 | 5/2011 | Ueda et al. |
| 7,950,059 | B2 | 5/2011 | Aharon et al. |
| 7,995,584 | B2* | 8/2011 | Eswaran et al. ......... 370/395.32 |
| 8,042,182 | B2 | 10/2011 | Milani Comparetti et al. |
| 8,112,800 | B1 | 2/2012 | Yang et al. |
| 8,166,554 | B2 | 4/2012 | John |
| 8,209,756 | B1 | 6/2012 | Guruswamy et al. |
| 8,228,926 | B2* | 7/2012 | Miller et al. .................. 370/401 |
| 8,291,495 | B1 | 10/2012 | Burns et al. |
| 8,397,284 | B2 | 3/2013 | Kommareddy et al. |
| 8,443,442 | B2 | 5/2013 | Wang et al. |
| 8,572,717 | B2 | 10/2013 | Narayanaswamy |
| 2002/0103953 | A1* | 8/2002 | Das et al. ...................... 710/105 |
| 2002/0144156 | A1* | 10/2002 | Copeland, III ............... 713/201 |
| 2003/0088788 | A1 | 5/2003 | Yang |
| 2003/0105976 | A1 | 6/2003 | Copeland, III |
| 2003/0140140 | A1 | 7/2003 | Lahtinen |
| 2003/0149888 | A1* | 8/2003 | Yadav .......................... 713/200 |
| 2003/0154399 | A1 | 8/2003 | Zuk et al. |
| 2004/0151206 | A1 | 8/2004 | Scholte |
| 2004/0205360 | A1 | 10/2004 | Norton et al. |
| 2004/0268149 | A1 | 12/2004 | Aaron |
| 2005/0055399 | A1* | 3/2005 | Savchuk ....................... 709/203 |
| 2005/0243789 | A1 | 11/2005 | Dinello et al. |
| 2005/0262560 | A1* | 11/2005 | Gassoway ...................... 726/22 |
| 2006/0059551 | A1 | 3/2006 | Borella |
| 2006/0101511 | A1 | 5/2006 | Faillenot et al. |
| 2006/0114832 | A1 | 6/2006 | Hamilton et al. |
| 2006/0123479 | A1 | 6/2006 | Kumar et al. |
| 2006/0167915 | A1 | 7/2006 | Furlong et al. |
| 2006/0168273 | A1* | 7/2006 | Michael ........................ 709/230 |
| 2006/0174337 | A1 | 8/2006 | Bernoth |
| 2006/0259950 | A1 | 11/2006 | Mattsson |
| 2006/0268932 | A1 | 11/2006 | Singh et al. |
| 2006/0288418 | A1* | 12/2006 | Yang et al. ..................... 726/24 |
| 2007/0005801 | A1 | 1/2007 | Kumar et al. |
| 2007/0067445 | A1 | 3/2007 | Vugenfirer et al. |
| 2007/0171827 | A1 | 7/2007 | Scott et al. |
| 2007/0192847 | A1 | 8/2007 | Yeom |
| 2007/0192863 | A1 | 8/2007 | Kapoor et al. |
| 2007/0230445 | A1 | 10/2007 | Barrie et al. |
| 2008/0133518 | A1 | 6/2008 | Kapoor et al. |
| 2008/0172731 | A1 | 7/2008 | Aaron |
| 2008/0229415 | A1 | 9/2008 | Kapoor et al. |
| 2009/0141729 | A1* | 6/2009 | Fan ............................... 370/401 |
| 2010/0085975 | A1* | 4/2010 | Wang et al. .............. 370/395.53 |
| 2010/0095367 | A1 | 4/2010 | Narayanaswamy |

OTHER PUBLICATIONS

Response to Office Action dated Nov. 9, 2010, from U.S. Appl. No. 11/937,163, filed Feb. 9, 2011, 22 pp.

U.S. Appl. No. 11/835,923, filed Aug. 8, 2007, entitled, "Identifying Applications for Intrusion Detection Systems," Burns et al.

U.S. Appl. No. 11/937,163, filed Nov. 8, 2007, entitled, "Multi-Layered Application Classification and Decoding," Yang et al.

Office Action from U.S. Appl. No. 11/937,163, dated Apr. 20, 2011, 17 pp.

Response to Office Action dated Apr. 20, 2011, from U.S. Appl. No. 11/937,163, filed Jul. 20, 2011, 17 pp.

Office Action from U.S. Appl. No. 11/835,923, mailed Aug. 6, 2010, 24 pp.

Response to Office Action mailed Aug. 6, 2010, from U.S. Appl. No. 11/835,923, filed Nov. 8, 2010, 20 pp.

U.S. Appl. No. 11/045,572, by Kowsik Guruswamy, filed Jan. 27, 2005.

Andrew Moore, "Internet traffic Classification using bayesian analysis techniques," Jun. 2005, ACM DL, vol. 33, Issue 1, pp. 53-60.

Response to Non-Final Office Action dated Feb. 25, 2013, from U.S. Appl. No. 13/367,183, filed May 28, 2013, 14 pp.

Response to Office Action dated Aug. 7, 2013 from U.S. Appl. No. 13/367,183, filed Nov. 7, 2013, 16 pp.

Non-Final Office Action from U.S. Appl. No. 13/367,183, dated Feb. 25, 2013, 20 pp.

Dreger et al., "Dynamic application-layer protocol analysis for network intrusion detection," Proceedings of the USENIX Security Symposium, Jul. 31, 2006, pp. 257-272.

Office Action from U.S. Appl. No. 14/336,501, dated Feb. 2, 2016, 12 pp.

Response to Office Action dated Feb. 2, 2016, from U.S. Appl. No. 14/336,501, filed on May 2, 2016, 10 pp.

* cited by examiner

US 9,398,043 B1

APPLYING FINE-GRAIN POLICY ACTION TO ENCAPSULATED NETWORK ATTACKS

TECHNICAL FIELD

This disclosure relates to computer networks and, more particularly, to detection and prevention of attacks in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Conventional techniques for detecting network attacks use pattern matching. In particular, an intrusion detection and prevention device (IDP) applies regular expressions or substring matches to detect defined patterns within a data stream. Multiple patterns may be used in an attempt to improve the accuracy of the attack detection. In order to improve the probability of detecting an attack, the IDP may attempt to identify the type of software application and protocol associated with the data stream. Based on the identification, the IDP selects the appropriate patterns to apply in order to detect a network attack, such as viruses or other malicious activity.

Traffic encapsulation is becoming more popular. Encapsulation may occur at any layer of the open systems interconnection (OSI) networking model. The purpose could be encryption (e.g. secure sockets layer (SSL), network tunneling (e.g. generic routing encapsulation (GRE)), or simply protocol reusing (e.g. KAZAA over hypertext transfer protocol (HTTP)). In some cases, multiple levels of encapsulation are used to convey network traffic. For example, a network tunnel may carry traffic that itself encapsulates multiple sub-tunnels. In this case, a single packet for the network tunnel may include sub-packets corresponding to the sub-tunnels, and each of the sub-packets contains a header and a payload. This disclosure refers to the packet comprising the sub-packets as an "outer packet" of an "outer session" and the sub-packets as "inner packets" of "inner sessions" or "encapsulated sessions." Accurately detecting network attacks within encapsulated network traffic represents a challenge to intrusion detection systems.

SUMMARY

In general, this disclosure describes techniques for applying a policy action to malicious inner packets of encapsulated network traffic and forwarding a remainder of an outer packet and the remaining inner packets that are not determined to be malicious. An intrusion detection and prevention device (IDP) may, for example, receive a packet flow of network packets that each encapsulates one or more inner packet flows. The IDP extracts and orders the encapsulated sub-packets to reconstitute corresponding individual packet flows. The IDP may then individually inspect each of the inner packet flows to detect attacks. Thus, for a particular outer packet containing one or more sub-packets, the IDP may inspect each of the sub-packets as part of a separate, corresponding inner packet flow. The IDP may then properly reconstruct the outer packet to include only those sub-packets that are not determined to be malicious. Upon identifying a malicious sub-packet, the IDP may apply a policy action based on a policy for the sub-packet. The policy may be based on, for example, a protocol of the network session corresponding to the sub-packet, an application for the network session, a sender or receiver of the sub-packet, or other criteria. The policy action may include, for example, closing the network session, dropping the sub-packet, sending an alert, or other actions.

In one example, a method includes receiving a packet of a packet flow, the packet comprising a packet header and one or more sub-packets encapsulated within the packet, each of the one or more sub-packets corresponding to respective encapsulated network sessions, analyzing each of the one or more sub-packets encapsulated within the packet, identifying one of the encapsulated network sessions as a malicious encapsulated network session based on the analysis of the one or more sub-packets, executing a targeted policy action on the one of the sub-packets corresponding to the malicious encapsulated network session based on the identification of the malicious encapsulated network session, and when at least one of the one or more sub-packets does not correspond to one of the malicious encapsulated network session, the method comprises forming a reconstructed packet comprising the packet header and the plurality of sub-packets excluding the sub-packet corresponding to the malicious encapsulated network session and forwarding the reconstructed packet.

In another example, a device includes a flow analysis module configured to receive a packet of a packet flow, the packet comprising a packet header and one or more sub-packets each corresponding to respective encapsulated network sessions, an attack detection module configured to analyze the one or more sub-packets and to identify at least one of the encapsulated network sessions as a malicious encapsulated network session based on the analysis, a policy action module configured to execute a policy action on the sub-packet corresponding to the malicious encapsulated network session based on the identification of the malicious encapsulated network session, and a forwarding component configured to form a reconstructed packet comprising the packet header and the plurality of sub-packets excluding the sub-packet corresponding to the malicious encapsulated network session and forward the reconstructed packet when the one or more sub-packets includes at least one packet that does not correspond to a malicious encapsulated network session.

In another example, a system includes a tunnel termination device configured to receive a packet flow from a network, wherein the packet flow comprises one or more encapsulated encapsulated network sessions, wherein the tunnel termination device decapsulates the packet flow and forwards decapsulated data from the decapsulated packet flow, a network device configured to receive at least a portion of the decapsulated data from the tunnel termination device, an intrusion detection device upstream from the tunnel termination device, the intrusion detection device comprising, a flow analysis module configured to receive a packet of the packet flow, the packet comprising a packet header and one or more sub-packets each corresponding to respective ones of the encapsulated encapsulated network sessions, an attack detection module configured to identify at least one of the encapsulated network sessions as a malicious encapsulated network session, a policy action module configured to execute a policy action on the sub-packet corresponding to the malicious encapsulated network session based on the identification of the malicious encapsulated network session, and a forwarding component configured to form a reconstructed packet comprising the packet header and the one or more sub-packets excluding the sub-packet corresponding to the malicious encapsulated network session and forwards the reconstructed packet to the tunnel termination device when the one or more sub-packets includes at least one sub-packet that does not correspond to a malicious encapsulated network session.

In another example, a computer-readable medium, such as a computer-readable storage medium, contains, e.g., is encoded with, instructions that cause a programmable processor to receive a packet of a packet flow, the packet comprising a packet header and a one or more sub-packets each corresponding to respective encapsulated network sessions, identify at least one of the encapsulated network sessions as a malicious encapsulated network session, execute a policy action on the sub-packet corresponding to the malicious encapsulated network session based on the identification of the malicious encapsulated network session, and, when at least one of the one or more sub-packets does not correspond to one of the malicious encapsulated network session, form a reconstructed packet comprising the packet header and the one or more sub-packets excluding the sub-packet corresponding to the malicious encapsulated network session and forward the reconstructed packet.

The techniques described in this disclosure may provide several advantages. For example, the techniques may enable a network device, such as an IDP, to apply a policy action, such as closing a session or dropping packets of an encapsulated network session, to only a relevant subset of sub-packets of a packet encapsulating the sub-packets. In particular, the IDP may apply the policy action to only those sub-packets and/or inner sessions that the IDP determines are malicious. In this manner, the IDP may be configured to apply a fine-grain policy action, i.e., applying the policy action to only those sub-packets determined to belong to a malicious encapsulated network session. Using the techniques described herein to apply policy actions to the sub-packets, the IDP may avoid discarding entire packets that encapsulate both malicious and non-malicious sub-packets, as may occur in a more course-grained approach. The IDP may also efficiently store identifications of malicious inner sessions, e.g., without storing 5-tuples of the outer session with each session key of the encapsulated session. Further, the IDP may reuse internal processing modules otherwise applied to non-encapsulated traffic, such as processing modules used for Internet protocol (IP) defragmentation, session lookup, transmission control protocol (TCP) reassembly, application-layer identification and decoding, and pattern matching and attack detection.

The details of one or more examples are set forth in the accompanying drawings and the description below. Other features, objects, and advantages will be apparent from the description and drawings, and from the claims.

DETAILED DESCRIPTION

Figure 1:
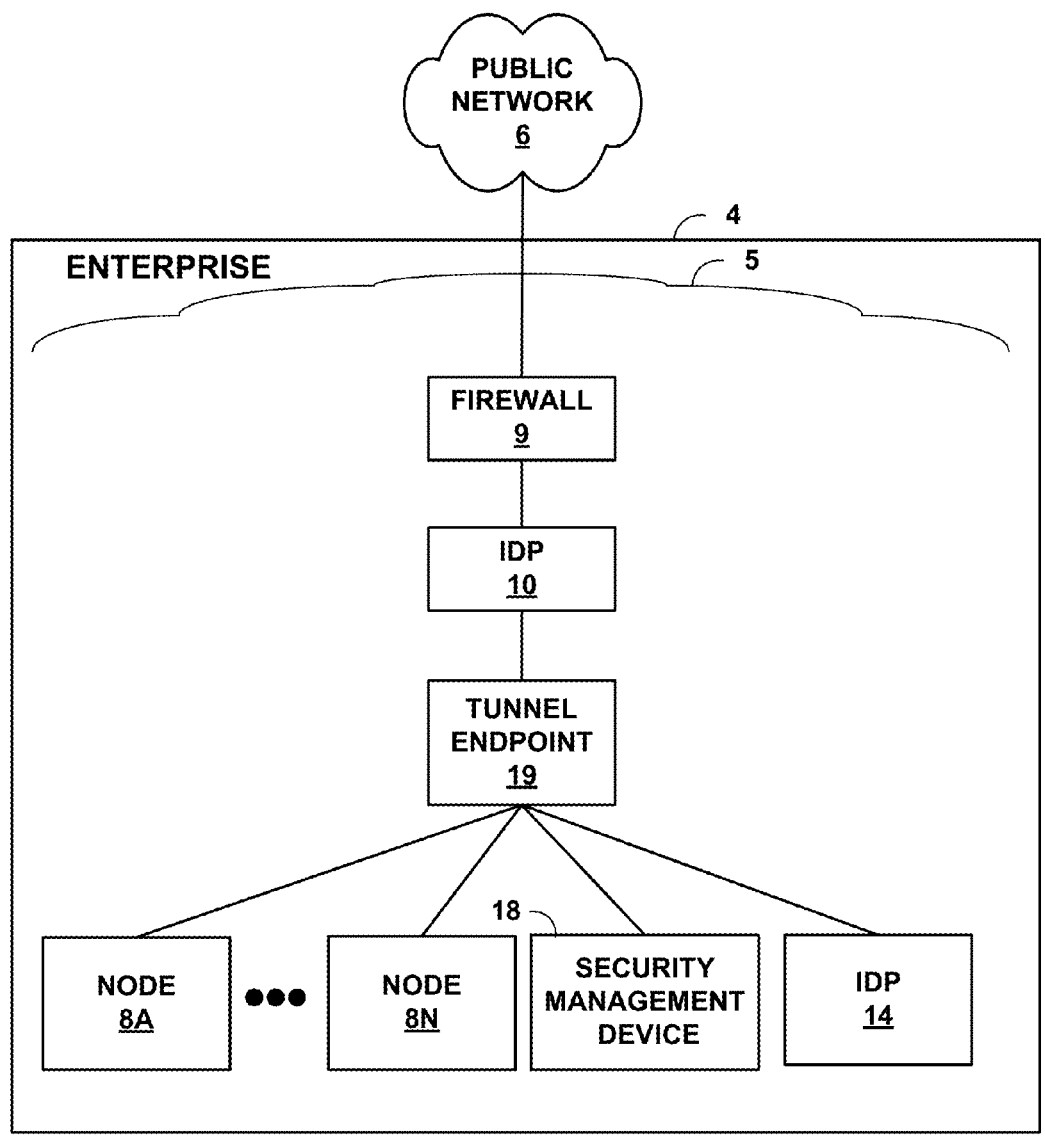
FIG. 1 is a block diagram illustrating an exemplary enterprise computer network in which an intrusion detection system (IDP) detects a malicious, encapsulated network session, in accordance with the techniques described in this disclosure.

FIG. 1 is a block diagram illustrating an exemplary enterprise computer network 4 in which an intrusion detection system (IDP) 10 detects a malicious, encapsulated network session, in accordance with the techniques described in this disclosure. In the example of FIG. 1, IDP 10 is a single network device. In other examples, a device or system may perform substantially similar functions to an IDP, and may be included in another device or system. For example, any of firewall 9, tunnel endpoint 19, security management device 18, IDP 14, or individual ones of nodes 8A-8N, may perform the functions described with respect to IDP 10. In another, components of IDP 10 may be used within an intrusion detection system (IDS). In general, the techniques of this disclosure are described with respect to IDP 10, i.e., an IDP that lies in front of a tunnel termination point, such as tunnel endpoint 19 in the example of FIG. 1.

Network 4 includes a private enterprise computing network 5 that is coupled to public network 6, such as the Internet. Public network 6 may include, for example, one or more client computing devices. Firewall 9 protects private enterprise network 5 and, in particular, internal computing nodes 8A-8N (computing nodes 8). Computing nodes 8 represent any private computing device within enterprise network 5, for example, workstations, laptops, file servers, print servers, database servers, web servers, e-mail servers, databases, printers, personal digital assistants (PDAs), smart phones, and other devices. Security management device 18 may manage one or more network security devices of enterprise network 5, e.g., IDP 10, firewall 9, IDP 14, or one or more of computing nodes 8. In one example, security management device 18 may implement the simple network management protocol (SNMP) to modify settings of the network security devices.

In the example of FIG. 1, enterprise network 5 includes IDP 10 that monitors traffic flowing between firewall 9 and internal computing nodes 8. In particular, IDP 10 monitors packets of a packet flow, where the packets encapsulate sub-packets of encapsulated packet flows, in addition to normal packets. IDP 10 attempts to determine whether a particular network communication represents a network attack. The network communication may be a standard packet or an encapsulated sub-packet. IDP 10 may first attempt to identify an application associated with the network communication. IDP 10 may also determine whether the network communication represents a multi-layered application. Further details on application identification, e.g., for multi-layered applications, may be found within U.S. patent application Ser. No. 11/937,163, Yang et al., "Multi-layered Application Classification and Decoding," filed Nov. 8, 2007, and U.S. patent application Ser. No. 11/835,923, Burns et al., "Identifying Applications for Intrusion Detection Systems," filed Aug. 8, 2007, each of which are hereby incorporated by reference in their respective entireties.

IDP 10 may also integrate pattern matching with application- and protocol-specific anomaly detection to identify sophisticated attack behaviors. In one example, IDP 10 allows the system administrator to specify attack definitions. The system administrator may specify compound attack definitions. Further details on application of attack definitions, e.g., compound attack definitions, may be found within U.S. patent application Ser. No. 11/045,572, Guruswamy et al., "Compound Attack Detection in a Computer Network," filed Jan. 27, 2005, which is hereby incorporated by reference in its entirety.

The attack definitions may specify, for example, any combination of textual and non-textual (e.g., binary) patterns and protocol anomalies to define complex attack signatures. Moreover, IDP 10 may associate particular signatures with protocols of certain applications. For a given communication session intercepted by IDP 10, the IDP attempts to identify the application type and underlying protocol for the packet flows of the session in order to select one or more attack signatures to apply to the packet flows.

IDP 10 identifies packet flows in the monitored traffic, and transparently reassembles application-layer communications from the packet flows. A set of protocol-specific decoders within the IDP 10 analyzes the application-layer communications and identifies application-layer transactions. In general, a "transaction" refers to a bounded series of related application-layer communications between peer devices. This disclosure may also refer to a transaction as a network session. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder identifies each request/response within the TCP connection as a different transaction. This may be useful to prevent certain attack definitions from being applied across transaction boundaries. In one example, a transaction may be identified according to source and destination IP address, protocol, and source and destination port numbers. Other examples may identify a transaction in other ways, for example, by using media access control (MAC) addresses.

For each transaction, the corresponding decoder analyzes the application-layer communications and extracts protocol-specific elements. For example, for an FTP login transaction, the FTP decoder may extract a pattern corresponding to a user name, a name for the target device, a name for the client device, or other information. Because a single packet flow may have multiple associated applications, IDP 10 may switch decoders "on the fly." IDP 10 may also modify the determination of application(s) corresponding to the packet flow as IDP 10 inspects more packets of the packet flow, e.g., because the application has changed or because an application uses the application layer of the OSI model as a transport layer. That is, one decoder may be analyzing the packet flow, but IDP 10 may transfer control to a different decoder in response to a change in the application.

In some cases, IDP 10 receives a packet flow that includes one or more encapsulated packet flows for various network sessions or transactions. That is, IDP 10 may receive a packet of the packet flow that includes a plurality of encapsulated packets corresponding to various network sessions. The encapsulated packets are also referred to in this disclosure as "sub-packets." In accordance with the techniques of this disclosure, upon receiving a packet that includes a plurality of sub-packets, IDP 10 may identify at least one of the network sessions as a malicious network session, execute a policy action on the sub-packet corresponding to the malicious network session based on the identification of the malicious network session, form a reconstructed packet comprising the packet header and the plurality of sub-packets excluding the sub-packet corresponding to the malicious network session, and forward the reconstructed packet. The policy action may therefore be a fine-grain policy action, in that IDP 10 applies the policy action only to the encapsulated, malicious packet flow, without applying the policy action to encapsulated packet flows that are not determined to be malicious. IDP 10 may also reconstruct application-layer communications for the encapsulated packet flow by extracting sub-packets of the encapsulated packet flow from a plurality of encapsulating outer packets, i.e., the packets that encapsulate the sub-packets, in order to determine whether the encapsulated packet flow represents a network attack.

One example of a packet flow that includes one or more encapsulated packet flows for various network sessions may be, for example, a packet flow corresponding to the generic routing encapsulation (GRE) protocol. IDP 10 may implement the GRE protocol to identify encapsulated, malicious network sessions. That is, IDP 10 may identify individual packet flows of the encapsulated network sessions. IDP 10 may then apply the attack definitions to each of the individual packet flows to detect and prevent network attacks. In the event that IDP 10 detects a network attack of one of individual packet flows, IDP 10 may execute a policy action, such as dropping the sub-packets of the malicious network session. Other examples of tunnel encapsulation protocols include, but are not limited to, the general packet radio service (GPRS) tunneling protocol (GTP), IP-in-IP, transport layer security (TLS), secure socket layer (SSL), and hypertext transport protocol secure (HTTPS). Some protocols, such as GRE, may encapsulate a plurality of sub-packets in a single encapsulating outer packet of a packet flow. Other protocols, such as HTTPS, encapsulate a single packet in an outer packet, such that there is a one-to-one correspondence between an outer packet and an encapsulated sub-packet. Although generally described with respect to protocols that encapsulate a plurality of sub-packets, the techniques of this disclosure are also applicable to those protocols that encapsulate only a single packet. Moreover, the techniques of this disclosure are applicable to protocols in which a packet of an encapsulated packet flow is divided among a plurality of encapsulating packets. Accordingly, these techniques can be applied in a variety of situations, including where the ratio of encapsulating packets to encapsulated packets is any of 1:1, 1:N, N:1, and M:N, where M and N are finite integers. The techniques are also applicable to protocols that provide multiple layers of encapsulation.

IDP 10 applies the attack definitions to the elements and the protocol-specific anomalies identified by the protocol decoders to detect and prevent network attacks. For example, a system administrator may specify a compound network attack that includes the protocol anomaly of repeated FTP login failure and a pattern that matches a login username of "root." In this manner, the system administrator may combine pattern analysis with protocol anomalies to define complex attack definitions. In the event of a network attack, IDP 10 may take one or more programmed actions, such as automatically dropping packet flows associated with the application-layer communications within which the network attack was detected.

IDP 10 inspects packets before the packets reach tunnel endpoint 19. IDP 10 may identify a sub-packet of a malicious network session that is encapsulated within a particular outer packet. IDP 10 may respond to a detection of such a sub-packet by removing the sub-packet from the outer packet. That is, IDP 10 may reconstruct an outer packet that encapsulates all of the original data except the sub-packet that IDP 10 determined belonged to a malicious network session. IDP 10 forwards to tunnel endpoint 19 packets in which no attack has been detected as well as reconstructed packets.

Tunnel endpoint 19 may comprise, for example, a router or a switch with a plurality of network interface cards (NICs) that interface with computing nodes 8, security management device 18, IDP 14, or other network devices. For stand-alone packets, tunnel endpoint 19 identifies the destination of the packets and forwards the packets to the destination. For outer packets encapsulating one or more sub-packets, tunnel endpoint 19 identifies destinations corresponding to the sub-packets and forwards the sub-packets to their respective destinations. Tunnel endpoint 19 may also act as a tunnel start point. Tunnel endpoint 19 may implement the GRE protocol or other encapsulation protocol.

IDP 10, employing the techniques described herein, may provide several advantages. For example, IDP 10 may apply a policy action, such as closing a session or dropping packets of a network session, to only a subset of sub-packets of a packet encapsulating the sub-packets. In particular, IDP 10 may apply the policy action to only those sub-packets that IDP 10 determines are malicious. In this manner, IDP 10 may apply a fine-grain policy action, i.e., apply the policy action to only those sub-packets determined to belong to a malicious network session. IDP 10 may forward sub-packets that IDP 10 does not determine are malicious, even when a packet encapsulating the non-malicious sub-packets also encapsulates a sub-packet that IDP 10 determines is malicious. Using the techniques described herein to apply policy actions to the sub-packets, IDP 10 may avoid discarding entire packets that encapsulate both malicious and non-malicious sub-packets, as may occur in a more course-grained approach. In some examples, an existing IDP may be reprogrammed to incorporate the techniques described herein, such that new internal processing modules may interact with one or more existing modules of the existing IDP to reuse the existing modules of the IDP.

Figure 2:
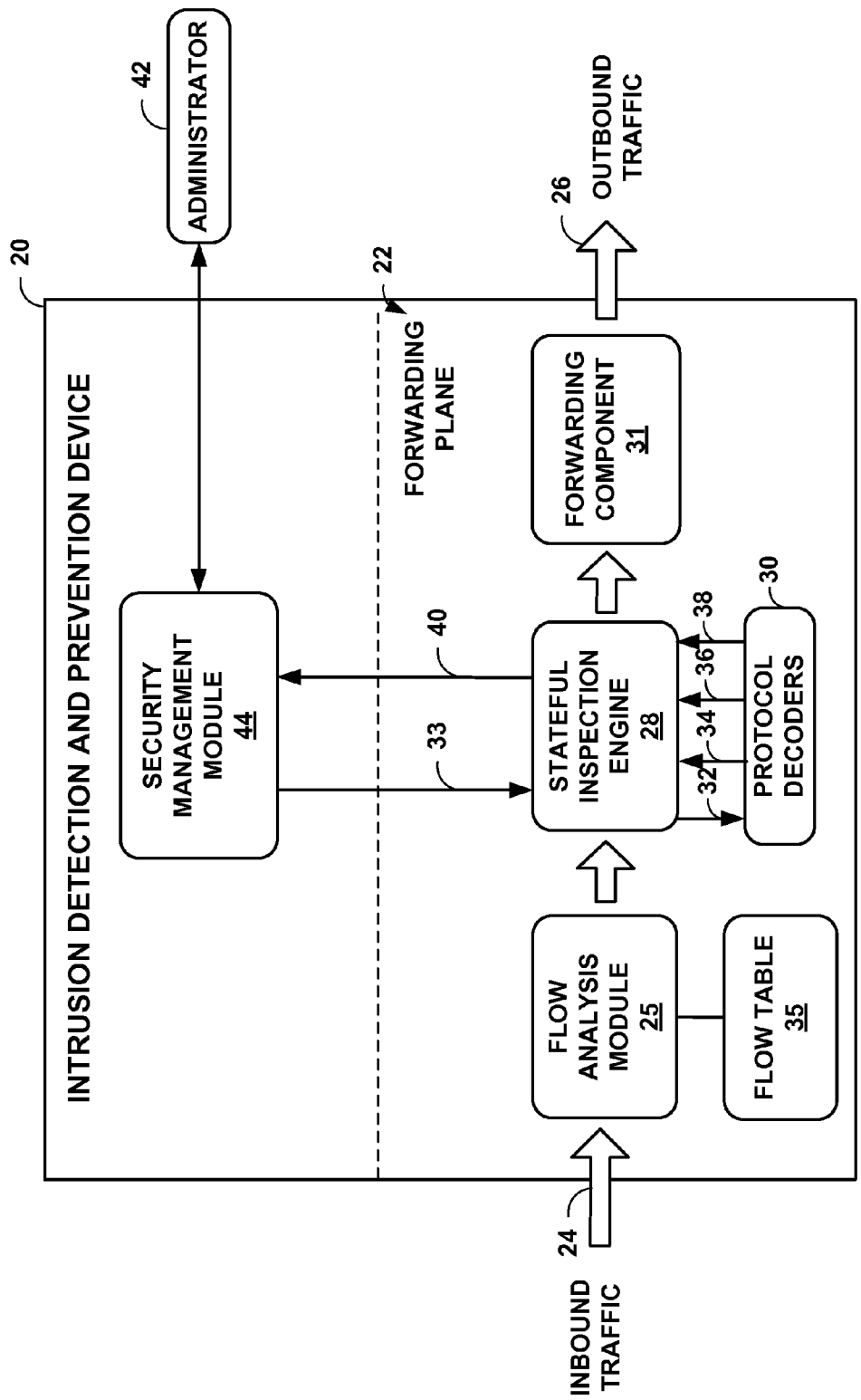
FIG. 2 is a block diagram illustrating an example arrangement of an IDP.

FIG. 2 is a block diagram illustrating an example arrangement of an IDP 20. In the illustrated example, IDP 20 includes a forwarding plane 22 that transparently monitors inbound network traffic 24 and forwards the network traffic as outbound network traffic 26. In the example illustrated by FIG. 2, forwarding plane 22 includes flow analysis module 25, stateful inspection engine 28, a plurality of protocol decoders 30, forwarding component 31 and security management module 44. The example of IDP 20 of FIG. 2 illustrates IDP 20 as a single network device, such as IDP 10 or 14 of FIG. 1. Other examples may implement the functionality of IDP 20 in multiple network devices or in other types of devices, such as security management device 18, tunnel endpoint 19, or firewall 9 of FIG. 1.

Security management module 44 presents a user interface by which administrator 42 configures IDP 20. For example, administrator 42 may configure IDP 20 to monitor particular subnets of the enterprise network. In addition, security management module 44 presents a user interface by which administrator 42 may specify attack definitions 33, which security management module 44 relays to stateful inspection engine 28. In one example, attack definitions 33 may be compound attack definitions. Moreover, security management module 44 may present a user interface by which administrator 42 may modify assumptions regarding packet flow characteristics, such as the highest priority packet flows for monitoring, port bindings for applications, or other features of determining a type of application and protocol associated with the packet flow. In one example, security management device 18 (FIG. 1) may implement the functionality of security management module 44 to enable administrator 42 to program IDP 20 remotely. Security management device 18 may configure IDP 20 via, for example, the simple network management protocol (SNMP) in accordance with a configuration received from administrator 42.

Flow analysis module 25 receives inbound traffic 24 and identifies network flows within the traffic. Each network flow represents a flow of packets in one direction within the network traffic and is identified by at least a source address, a destination address and a communication protocol. Flow analysis module 25 may utilize additional information to specify network flows, including source media access control (MAC) address, destination MAC address, source port, and destination port. Other examples may use other information to identify network flows, such as IP addresses.

Flow analysis module 25 maintains data within flow table 35 that describes each active packet flow present within the network traffic. Flow table 35 specifies network elements associated with each active packet flow, i.e., low-level information such as source and destination devices and ports associated with the packet flow. In addition, flow table 35 may identify pairs of packet flows that collectively form a single communication session between a client and server. For example, flow table 35 may designate communication session as pairs of packet flows in opposite directions for flows sharing at least some common network addresses, ports and protocol.

Flow table 35 also stores network session information. In one example, flow table 35 may include or represent a hash table. In one example, flow table 35 may correspond to the plurality of hash tables described with respect to the example of FIG. 7. That is, IDP 20 may store network session information in one or more hash tables. In one example, IDP 20 includes a first hash table for storing identification information for network sessions corresponding to outer packets, and a second hash table for storing identification information for individual encapsulated network sessions. When an outer packet does not include any inner (i.e., encapsulated) packets, IDP 20 stores a network session identifier in the first hash table. When an outer packet includes one or more encapsulated sub-packets, IDP 20 stores network session identifiers in the second hash table and a network session identifier for the outer packet in the first hash table. IDP 20 also includes pointers for each entry in the first hash table for associating entries in the first hash table with encapsulated sessions identified by the second hash table. When an entry in the first hash table has a pointer set to NULL, IDP 20 determines that the network session of that entry is a stand-alone network session without any encapsulated network sessions. However, when the pointer points to an entry in the second hash table, IDP 20 determines that the network session includes an encapsulated network session, i.e., the entry in the second hash table identified by the pointer. In another example, the first hash table stores an identifier for a network session and includes a null pointer when the network session is not encapsulated, and a pointer to an entry of the second hash table when the network session is encapsulated; the entry in the second hash table identified by the pointer corresponds to the outer packet.

As described in further detail below, stateful inspection engine 28 inspects packet flows to identify attacks within the packet flows. When a packet flow includes one or more encapsulated packet flows, stateful inspection engine 28 inspects the encapsulated packet flows of the encapsulating packet flow, i.e., outer packets of the outer packet flow. Stateful inspection engine 28 generally responds to a detected malicious packet flow according to a programmed action policy. When stateful inspection engine 28 determines that one or more of the encapsulated packet flows are malicious, stateful inspection engine 28 may send an alert 40 to security management module 44, store a record of the malicious packet flow, block the malicious packet flow, terminate a network session associated with the malicious packet flow, drop packets of the malicious packet flow, or take other actions, as described in greater detail below.

IDP 20 may use a minimum data size of the reassembled TCP segments, in addition to the signature, in order to identify applications corresponding to packet flows or encapsulated packet flows. Certain applications may require a minimum amount of data, so IDP 20 may distinguish malicious packet flows by determining whether the packet flow contains enough data for the identified protocol. Moreover, IDP 20 may not necessarily recognize every application. In one example, when an application is unknown, IDP 20 may simply forward the packet flow. Other examples may take other actions for unidentified applications, however, such as discarding all packets which target unknown applications or applying a default signature to all packet flows associated with unknown application types. Other examples may also utilize other protocols, such as the user datagram protocol (UDP); IDP 20 accordingly may require a minimum data size of UDP segments in order to identify the application associated with the UDP segments.

In one example, stateful inspection engine 28 may include a co-processor to perform application identification. The co-processor may continually receive input in the form of the packet flow and may constantly perform application identification on the packet flow. For each chunk of the packet flow, the co-processor may return the identity or identities the application(s) that the co-processor identified.

For each packet flow or encapsulated packet flow, stateful inspection engine 28 may buffer a copy of the packet flow and reassemble the buffered packet flow to form application-layer communications 32. For example, stateful inspection engine 28 may reconstruct TCP segments into application-layer communications 32, which represent protocol-specific messages. In one example, stateful inspection engine 28 may buffer only a certain portion of the packet flow, such as a certain number of bytes, e.g., 400 bytes of the packet flow.

Stateful inspection engine 28 may also save copies of packets or sub-packets in which stateful inspection engine 28 identifies a network attack. For example, stateful inspection engine 28 may save copies of a packet that includes one or more sub-packets corresponding to encapsulated packet flows. Upon identifying one of the sub-packets or packet flows as malicious, stateful inspection engine 28 may save a copy of the packet that encapsulated the malicious sub-packet. Stateful inspection engine 28 may also save copies of surrounding packets within the outer session/packet flow, e.g., ten packets before and ten packets after the packet in which the malicious sub-packet was identified. Stateful inspection engine 28 may also save copies of surrounding sub-packets corresponding to the malicious encapsulated packet flow or malicious inner network session, e.g., ten sub-packets before and ten sub-packets after the malicious sub-packet of the malicious network session, which may not necessarily be contained in the immediately surrounding outer packets. In this manner, stateful inspection engine 28 may save a set of outer packets before and after the outer packet that contained a sub-packet for which a malicious network session was detected, as well as a set of preceding and subsequent sub-packets of the packet flow corresponding to the malicious inner network session. Security management module 44 may receive a request from administrator 42 for one or more of the saved copies of packets. Security management module 44 may retrieve saved copies of packets from stateful inspection engine 28 and present data from the saved packets to administrator 42 via a user interface.

Stateful inspection engine 28 invokes one or more of protocol decoders 30 to analyze the application-layer communications 32 based on the identified type of applications identified for the packet flow. For example, stateful inspection engine 28 may select a single one of protocol decoders 30 in the event the stateful inspection engine determines that the packet flow originated from a single application-layer software application that relied exclusively on layer 4 transport for the application-layer data. As another example, stateful inspection engine 28 may select and apply multiple protocol decoders in the event it determines that the packet flow originated from multiple stacked application-layer software applications, i.e., that at least one application-layer software application is using another application-layer software application as a transport for its application-layer data. In this situation, stateful inspection engine 28 may construct a stack of protocol decoders for layered processing and decoding of the packet flow.

In general, protocol decoders 30 include a set of one or more protocol-specific software modules that process application-layer communications 32 and output transaction data 34 that identifies application-layer transactions. In particular, transaction data 34 indicate when a series of related application-layer communications between two peer devices start and end. In one example, one or more of protocol decoders 30 may be generic protocol decoders, such that the generic protocol decoders attempt to identify the application corresponding to the payload of an application-layer communication 32. An example of a generic protocol decoder is an algorithm that matches a predefined set of application fingerprints/signatures to the data being decoded and identifies the application based on a particular fingerprint match. For example, a generic protocol decoder may attempt to identify the application corresponding to the payload of an HTTP communication.

Many of protocol decoders 30 correspond to a different communication protocol or service. Examples of communication protocols that may be supported by protocol decoders 30 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols. In one example, each of protocol decoders 30 receives data via a universal software interface, i.e., a software interface that processes application data in a manner that is independent from the underlying transport mechanism. In this way, protocol decoders may be swapped, reused and stacked (layered) when applied to a given packet flow.

After application of protocol decoders 30 to a given packet flow or individual packet, the protocol decoders return transaction data 34, application-layer elements 36, and protocol anomaly data 38 to stateful inspection engine 28. Stateful inspection engine 28 applies attack definitions 33 to protocol-specific application-layer elements 36 and anomaly data 38 to detect and prevent network attacks and other security risks.

In the event a security risk is detected, stateful inspection engine 28 outputs alert 40 to security management module 44 for logging and further analysis. In addition, stateful inspection engine 28 may take additional actions according to a policy definition, such as dropping the packets associated with the communication session, automatically closing the communication session or other action. If no security risk is detected for a given application-layer communication session, forwarding component 31 continues to forward the packet flows between the peers. Forwarding component 31 may, for example, maintain a routing table that stores routes in accordance with a topology of the enterprise network for use in forwarding the packet flows. When stateful inspection engine 28 determines that only one or an incomplete subset of a plurality of encapsulated sub-packets corresponds to a malicious network session, forwarding component 31 may forward a reassembled packet comprising only those sub-packets that do not correspond to malicious network sessions.

Figure 3:
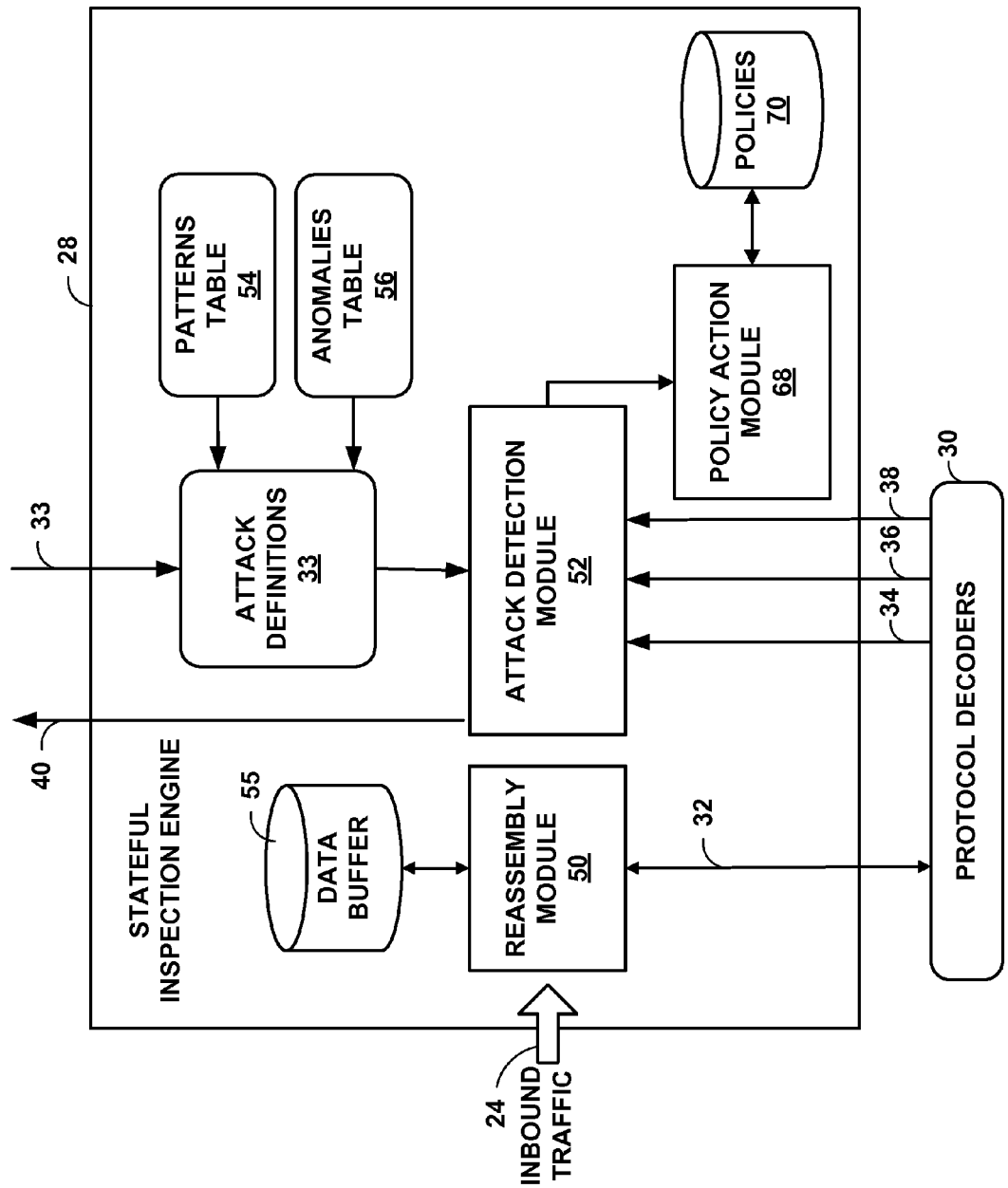
FIG. 3 is a block diagram illustrating an example stateful inspection engine of an IDP.

FIG. 3 is a block diagram illustrating an example of stateful inspection engine 28 of IDP 20. In the example, stateful inspection engine 28 includes reassembly module 50, attack detection module 52, patterns table 54, data buffer 55, anomalies table 56, attack definitions 33, policy action module 68, and policies 70.

Reassembly module 50 receives inbound network traffic 24 and reassembles application-layer communications 32 from the packet flows by removing any underlying transport information (e.g., layer four (L4) information and below). Reassembly module 50 forwards the reassembled application-layer communications 32 to the appropriate protocol decoders 30 for processing.

Stateful inspection engine 28 stores attack definitions 33 received from security management module 44. Attack definitions 33 may be stored, for example, in a computer-readable storage medium, such as random access memory (RAM). Each of attack definitions 33 specifies a combination of one or more patterns specified within patterns table 54 and one or more protocol-specific anomalies specified within anomalies table 56.

When stateful inspection engine 28 receives a packet as part of a packet flow, reassembly module 50 buffers the packet in data buffer 55. In one example, data buffer 55 may store data as a sliding window. That is, data buffer 55 may store data until becoming full or reaching a specified required amount of minimum data for identification. When full, data buffer 55 discards certain data to make room for storing new data. In one example, data buffer 55 may store and discard data according to a first-in, first-out (FIFO)-like protocol wherein the first data to be stored is the first data to be discarded when data buffer 55 becomes full. In another example, data buffer 55 may discard data according to a least recently used protocol wherein, when data buffer 55 is full, the packet flow which has been least recently used will be discarded to make room for new data to be stored.

In one example, reassembly module 50 may associate packets in a packet flow of a network session according to the 5-tuple {source IP address, destination IP address, protocol, source port, destination port}. Reassembly module 50 may associate packets of an encapsulated packet flow by combining the 5-tuple of the outer packets with the 5-tuple of the sub-packets. When the sub-packets do not include a 5-tuple, e.g., in the case of SSL which directly encapsulates layer-7 HTTP content, reassembly module 50 may construct a 5-tuple for the sub-packets. In one example, reassembly module 50 creates a pseudo-header, i.e., a virtual header, for the sub-packets from the outer packet source and destination IP addresses and source port number, a default destination port, e.g., port "80" or other commonly associated port binding corresponding to the identified application, and default TCP sequence numbers and IP ID numbers. In one example, for the pseudo-header, reassembly module 50 may use the outer header's source and destination IP addresses as the pseudo-header's source and destination IP addresses, respectively, and the outer header's source port as the pseudo-header's source port. In general, any numbers may work for the TCP sequence numbers and IP ID numbers, thus these numbers may be generally assigned as "magic numbers." The created pseudo-header may therefore comprise the constructed 5-tuple for the sub-packet. By prepending a virtual header, some examples of a device implementing the techniques described herein may reuse existing modules, such as an existing attack detection module 52 or existing protocol decoders 30, to process the encapsulated packets as if the encapsulated packets were regular, non-encapsulated packets.

Other examples may use other methods to associate packets with a particular packet flow or encapsulated packet flow. In one example, IDP 20 may be part of a network that utilizes virtual local area networks (VLANs). Accordingly, reassembly module 50 may associate packets in a packet flow according to a VLAN identifier, a source address, and a destination address. In some examples, an encapsulated packet, such as an encapsulated HTTPS packet, may exceed a limitation on the size of a packet that can be inspected by IDP 20. When an encapsulated packet exceeds such a limitation, IDP 20 may break the out-of-limit message into several smaller packets and process each of the smaller packets individually, then reassemble the smaller packets after they are inspected. In any case, reassembly module 50 may utilize the information maintained within flow table 35 (FIG. 2) to reassemble network data, e.g., to form reassembled TCP data.

Reassembly module 50 may assemble packet flows from packets that do not encapsulate sub-packets as well as from sub-packets forming an encapsulated packet flow. For a packet that does not encapsulate any sub-packets, reassembly module 50 buffers the packet. For a sub-packet encapsulated by an outer packet, reassembly module 50 buffers the sub-packet. Reassembly module 50 may store an identifier, such as a pseudo-header, for the sub-packet when the sub-packet does not include a header.

Attack detection module 52 applies compound attack definitions 33 to application-layer elements 36 and protocol anomaly data 38 received from protocol decoders 30. The application-layer elements 36 may comprise elements of non-encapsulated packet flows or encapsulated packet flows. That is, attack detection module 52 may detect network attacks in either normal, non-encapsulated network traffic or in encapsulated packet flows. For each of compound attack definitions 33, attack detection module 52 selects the one or more patterns within patterns table 52 specified by the compound attack definition and determines whether any of application-layer elements 36 match the defined patterns. Each of the patterns may be defined as a respective "regular expression," which generally refers to a formula that is used to match patterns within data.

In addition to determining whether the defined patterns are present, attack detection module 52 may determine whether any protocol anomalies detected by protocol decoders 30 match the protocol anomalies specified by attack definitions 33. Attack detection module 52 determines that the corresponding packet flow matches one of attack definitions 33 when both the patterns and protocol anomalies specified by the attack definition are detected within a given communication session. Further, each of attack definitions 33 may specify whether the pattern matching and protocol anomalies must be satisfied on a per-transaction basis or over the lifetime of the communication session.

Policy action module 68 performs actions according to one or more of policies 70 when attack detection module 52 determines that an encapsulated packet flow is malicious. Policies 70 define one or more actions for stateful inspection engine 28 to take upon identifying a malicious packet flow. Policies 70 may define different actions based upon an application associated with the malicious network session, whether the packet flow is encapsulated or not, what type of attack was detected, a source or source zone of the malicious network session, a destination or destination zone of the malicious network session, a source address, a destination address, or other information regarding the network session. Table 1 provides an example set of policies that policy action module 68 may perform in response to detection of a malicious network session:

TABLE 1

| Rule # | Source Zone | Dest. Zone | Source Address | Dest. Address | Application | Attack(s) | Action |
|---|---|---|---|---|---|---|---|
| 1 | Finance | HR | 1.1.1.1 | 2.2.2.2 | HTTP | http-1 http-2 | Drop |
| 2 | Any | Any | Any | Any | Default | ftp-1 dns-1 telnet-1 | Close server |
| 3 | Finance | Any | 1.1.1.2 | Any | FTP | ftp-2 | Close client |

In the example of table 1, each policy includes a rule number, a source zone, a destination zone, a source IP address, a destination IP address, an application, one or more attack types, and a policy action to perform. The parameters of a policy may specify "Any" or "Default" when no particular value is required for the parameter. Source zone and destination zone generally correspond to distinct computer network areas within an enterprise, such as enterprise computer network 4. In the example of table 1, there are two zones, "Finance" and "HR." Other zones may include, for example, accounting, sales, legal, engineering, a "demilitarized" zone (DMZ), or other zones. The source and destination address fields of table 1 correspond to particular IP addresses of a network device. A policy may therefore specify a particular IP address for either the source or destination of a packet or sub-packet. The application field of table 1 corresponds to an identified application for the network session, such as HTTP or FTP (file transfer protocol). The attack(s) field specifies one or more identified attacks for the policy. Attack detection module 52 may be capable of detecting multiple types of attacks for a particular application, therefore the attacks field may specify more than one attack type per policy. The action field of table 1 specifies an action for policy action module 68 to perform when a particular policy is triggered. A policy is triggered when an attack is detected for a network session and the attack matches each of the fields of the policy, e.g., each of the fields of one row of table 1.

Actions that may be performed by policy action module 68 include, for example, close-client, close-client-and-server, close-server, drop-connection, drop-packet, ignore-connection, mark-diffserv, no-action, and recommended (i.e., take the recommended action associated with the attacks). In one example, the IDP supports a user interface and a configuration syntax that allows an action to be defined in two stages, where the first stage represents the action to take when a malicious packet is "normal," i.e., the malicious packet does not encapsulate a sub-packet, and the second stage represents the action to take when the malicious packet is encapsulated by an outer packet. In this way, the user is able to apply differentiated actions based on whether the attack is within an encapsulated packet flow or not. The action definition may be represented in a manner similar to the following pseudocode:

Action {
  Field one: normal action to take if an attack is detected in normal packets Field two: encapsulated action to take if an attack is detected in encapsulated packets
}

In one example, policy action module 68 may include a set of default actions for an attack and a set of specific policies. For example, policy action module 68 may include a set of default actions to perform for a particular type of attack, depending upon the attack definition, which may include a field that identifies the default action for that attack. When an IDP policy action field contains specific actions for a particular attack definition, the specific actions may override the default action. Policies 70 may specify, for a particular attack, whether to use the default policy action or whether to perform a different action. In one example, a default policy may exist for the outer packet and a specific policy may exist for the inner packet. A user, such as administrator 42, may define a policy that uses either the default policy or the specific policy. For example, for the pseudocode shown above, administrator 42 may configure the action to take when the packet is encapsulated to be the same as the action to take when the packet is not encapsulated and does not encapsulate other packets.

For example, for two attacks "attack-1" and "attack-2," policy action module may include respective attack definitions, such as:

attack-1 {
. . .
default-action: drop-packet
. . .
}
attack-2 {
. . .
default-action: close-client
. . .
}

For the above two example attacks, policies 70 may define policies such as:
Rule-1:
from finance-zone 1.1.1.1 to engineering-zone 2.2.2.2 HTTP, attack-1: action: default
Rule-2:
From finance-zone 1.1.1.1 to engineering-zone 2.2.2.2 HTTP, attack-2: action: close-client-and-server An IDP implementing the above two example rules Rule-1 and Rule-2 may, upon determining that a first packet flow represents an attack of type "attack-1" from finance zone 1.1.1.1 to engineering zone 2.2.2.2 as an HTTP attack, execute the default action for attack-1, which as defined above is to drop packets for that packet flow. Likewise, upon determining that a second packet flow represents an attack of type "attack-2" from finance zone 1.1.1.1 to engineering zone 2.2.2.2 as an HTTP attack, execute the defined action, as opposed to the default action for "attack-2," i.e., close the session at both the client and the server, thus overwriting the default action for attack-2 of closing only the client.

In the event a security risk is detected, stateful inspection engine 28 outputs alert 40 to security management module 44 (FIG. 2) for logging and further analysis. Stateful inspection engine 28 may also direct forwarding component 31 to automatically drop the packet flow associated with the application-layer communications within which the network attack was detected. Stateful inspection engine 28 may also cause forwarding component 31 to send a close session message to one or more participants in the malicious network session. Forwarding component 31 may encapsulate the close session message in an outer packet constructed similarly to the outer packet for which a sub-packet associated with the malicious network session was detected. For example, the constructed outer packet may include information in the packet header similar to the packet header of the original outer packet, such as source and destination IP addresses, source and destination port numbers, protocol identifier, or other information.

Figure 4:
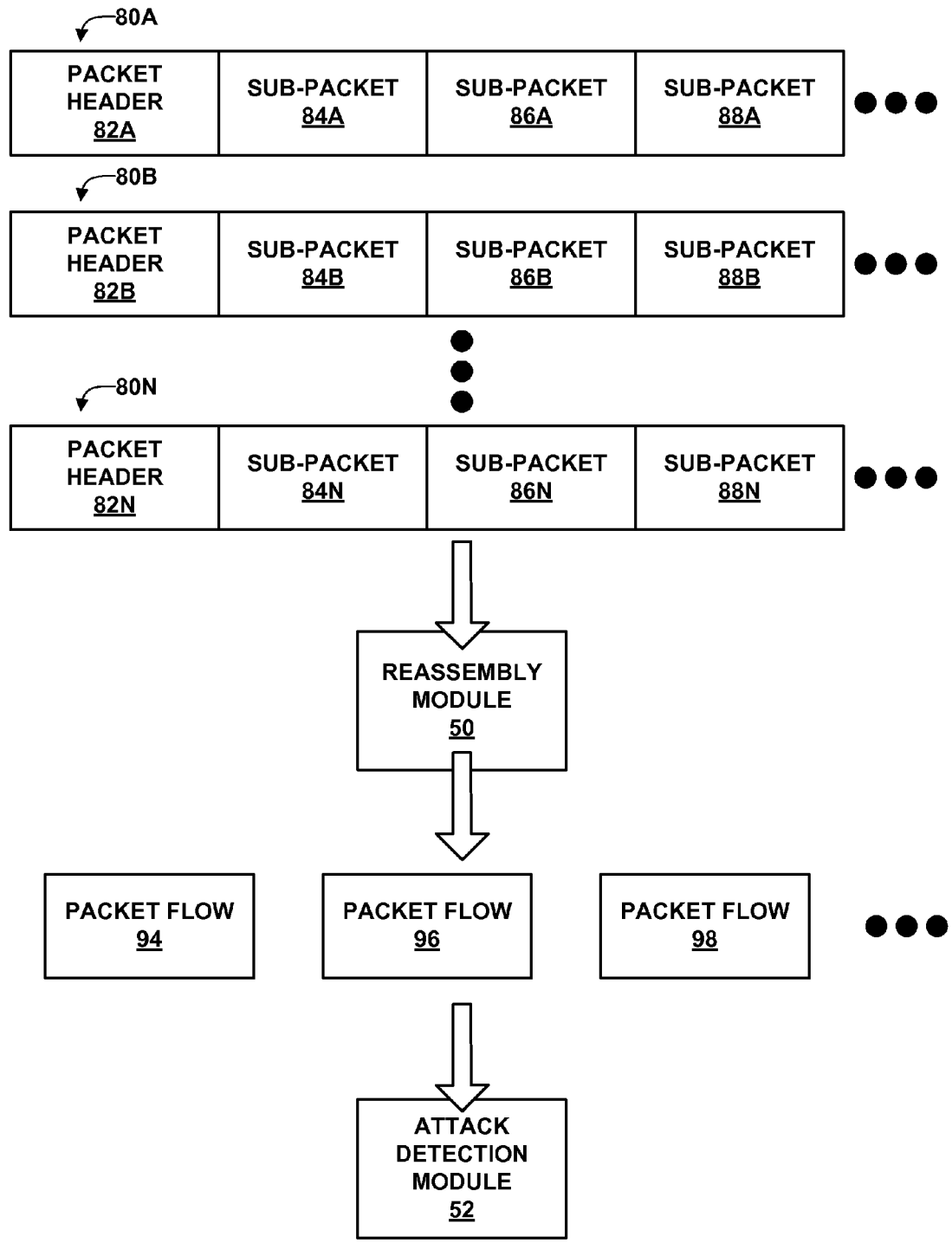
FIG. 4 is a conceptual diagram illustrating reassembly of packets from sub-packet parts encapsulated by outer packets in order to inspect the reassembled packets.

FIG. 4 is a conceptual diagram illustrating reassembly of packets from sub-packet parts encapsulated by outer packets. In the example of FIG. 4, packets 80A-80N (packets 80), also referred to herein as "outer packets," comprise one or more sub-packets, also referred to herein as "inner packets" or "encapsulated packets." In particular, the example of FIG. 4 depicts packets 80 comprising packet headers 82A-82N and sub-packets 84A-84N, 86A-86N, and 88A-88N (sub-packets 84, 86, 88). Although each of packets 80 is shown as including one of sub-packets 84, 86, 88, it should be understood that each of packets 80 need not necessarily include a sub-packet for each of encapsulated packet flow. For example, packet 80C (not shown) may only include sub-packet 84C and 88C without a sub-packet corresponding to sub-packets 86. Also, a sub-packet may be split among multiple packets 80. For example, sub-packet 88A and 88B may each comprise a partial packet, e.g., half of a full packet, such that when sub-packet 88A and sub-packet 88B are concatenated, the concatenation yields a full packet.

Reassembly module 50 receives packets 80 and reconstructs portions of packet flows 94, 96, 98 from sub-packets 84, 86, 88. In the example of FIG. 4, sub-packets 84 correspond to packet flow 94, sub-packets 86 correspond to packet flow 96, and sub-packets 88 correspond to packet flow 98. Packet flows 94, 96, 98 may only comprise representations of a portion of the actual packet flow, depending upon the availability of space within buffer 55. Packet flows 94, 96, 98 may generally also correspond to application-layer communications 32 (FIGS. 2 & 3). Attack detection module 52 may receive each of packet flows 94, 96, 98 from reassembly module 50 and inspect packet flows 94, 96, 98 to determine whether one or more of packet flows 94, 96, 98 represent a network attack.

Figure 5:
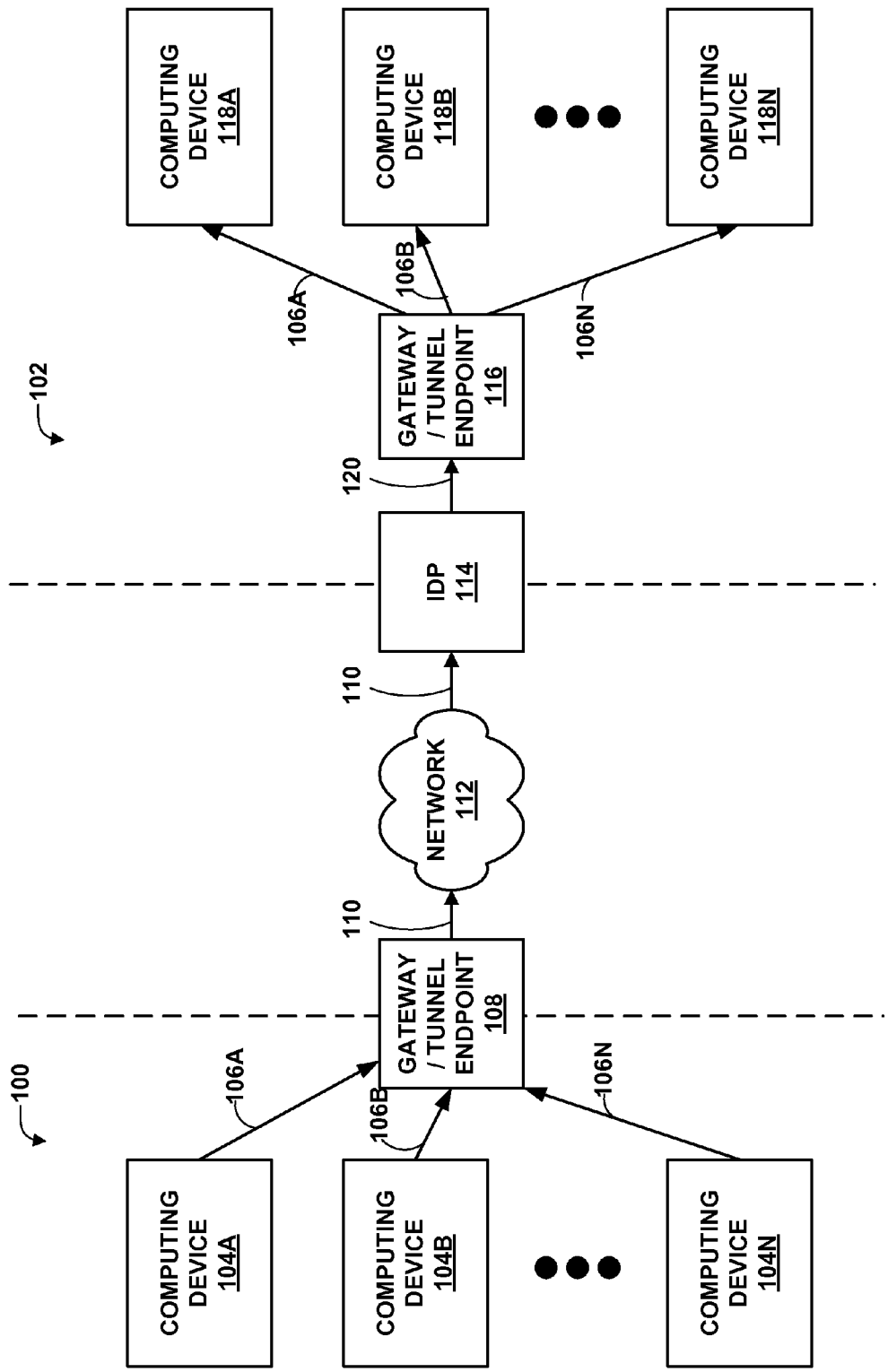
FIG. 5 is a block diagram illustrating an example in which devices of two networks communicate across an intermediate network through encapsulated packet flows of a network tunnel.

FIG. 5 is a block diagram illustrating an example in which devices of two networks 100, 102 communicate across network 112 through encapsulated packet flows 106A-106N (encapsulated packet flows 106) of network tunnel 110. Network 100 comprises computing devices 104A-104N (computing devices 104) and gateway/tunnel endpoint 108, while network 102 comprises computing devices 118A-118N (computing devices 118), gateway/tunnel endpoint 116, and IDP 114. Computing device 104A sends packets to computing device 118A along packet flow 106A, computing device 104B sends packets to computing device 118B along packet flow 106B, and computing device 104N sends packets to computing device 118N along packet flow 106N.

Each of computing devices 104 send packets of packet flows 106 to gateway/tunnel endpoint 108. Gateway/tunnel endpoint 108 may determine that network addresses of network 100 and/or network 102 are not routable through network 112. For example, either or both of networks 100, 102 may include network addressing spaces that are not identifiable by devices within network 112. Gateway/tunnel endpoint 108 may also determine that each of computing devices 104, or a subset of computing devices 104, are in communication with computing devices 118. Gateway/tunnel endpoint 108 encapsulates each of packet flows 106 in network tunnel 110. For example, gateway/tunnel endpoint 108 may implement GRE, GTP, IP-in-IP, or other protocols to perform packet flow encapsulation to facilitate sending packets through network 112. Gateway/tunnel endpoint 108 aggregates packets from one or more of packet flows 106 into an outer packet that contains the packets from packet flows 106, and forwards the outer packet to gateway/tunnel endpoint 116 through network 112.

Before traffic from network 112 reaches gateway/tunnel endpoint 116, IDP 114 intercepts and inspects the traffic. In particular, IDP 114 inspects packets of network tunnel 110. IDP 114 may correspond to IDP 10 or IDP 20, in some examples. Upon receiving an outer packet that encapsulates one or more sub-packets, IDP 114 inspects each of the sub-packets to determine whether the sub-packets correspond to a malicious network session. IDP 114 forwards only sub-packets that IDP 114 determines do not correspond to a malicious network session. For example, when IDP 114 detects a malicious sub-packet of a particular outer packet, IDP 114 assembles a reconstructed outer packet comprising each of the sub-packets of the outer packet except for the sub-packet determined to correspond to the malicious network session. IDP 114 forwards the reconstructed outer packet to gateway/tunnel endpoint 116. In this manner, IDP 114 may receive a packet of a packet flow, the packet comprising a packet header and a payload carrying a plurality of sub-packets of respective network sessions, identify at least one of the network sessions as a malicious network session, execute a policy action on the sub-packet corresponding to the malicious network session based on the identification of the malicious network session, form a reconstructed packet comprising the packet header and the plurality of sub-packets excluding the sub-packet corresponding to the malicious network session, and forward the reconstructed packet.

Gateway/tunnel endpoint 116 decapsulates outer packets comprising one or more sub-packets and forwards the sub-packets to their respective destinations. In the example of FIG. 5, gateway/tunnel endpoint 116 forwards sub-packets of packet flow 106A to computing device 118A, sub-packets of packet flow 106B to computing device 118B, and sub-packets of packet flow 106N to computing device 118N.

Figure 6:
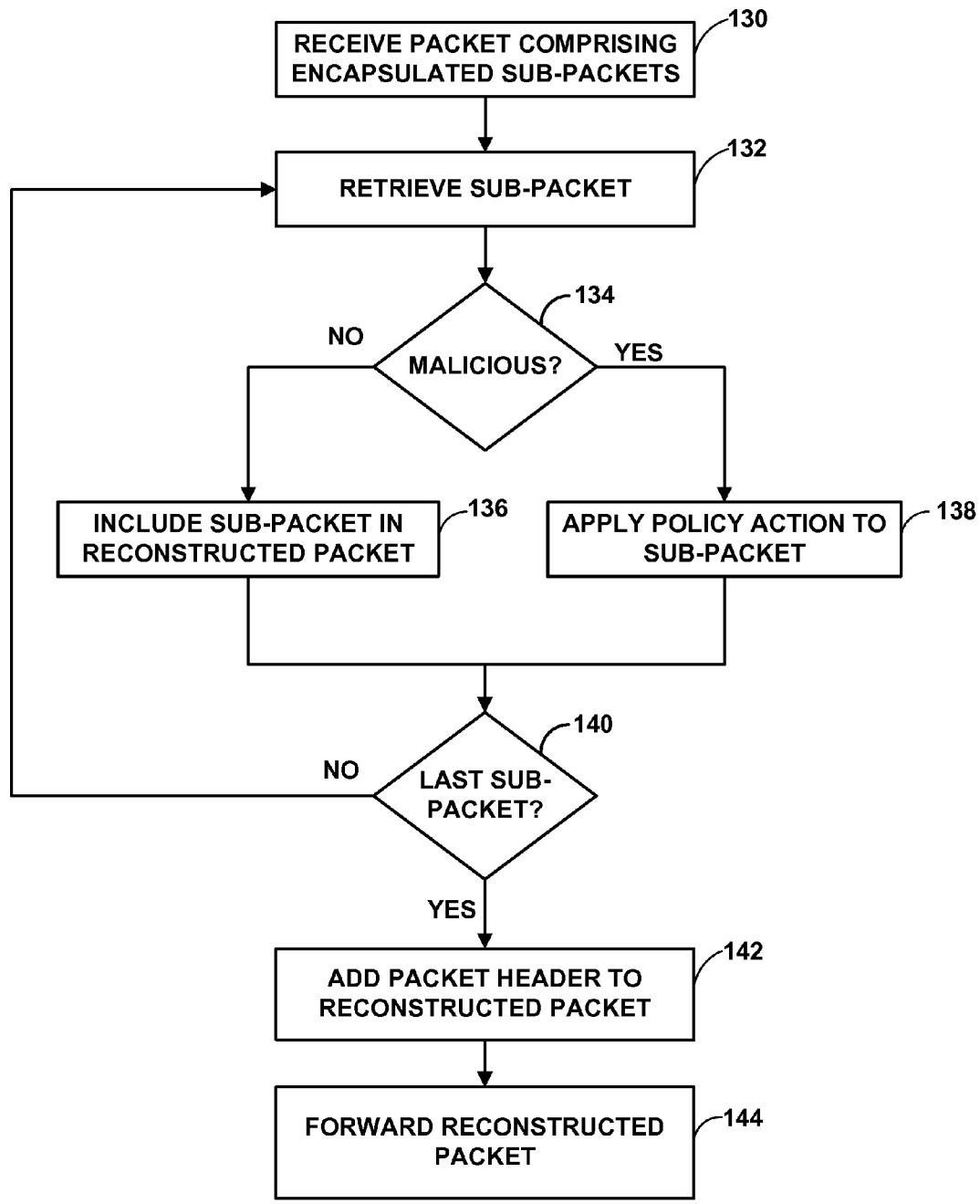
FIG. 6 is a flowchart illustrating an example method for applying a policy action to a sub-packet of an encapsulated network session.

FIG. 6 is a flowchart illustrating an example method for applying a policy action to a sub-packet of an encapsulated network session. Although the method of FIG. 6 is described with respect to IDP 20 of FIGS. 2 and 3, it should be understood that any network device that receives encapsulated packet flows may perform the method of FIG. 6.

Initially, IDP 20 receives a packet, i.e., an outer packet, comprising one or more sub-packets (130). The sub-packets may be whole packets or sub-packet parts. The sub-packets may each correspond to respective network sessions or packet flows. In one example, the packet may be a packet conforming to the GRE protocol. In another example, the packet may be a packet conforming to the hypertext transport protocol over secure socket layer (HTTPS) protocol. When one of the sub-packets is a sub-packet part, IDP 20 may reassemble a full packet from other sub-packet parts for the corresponding network session.

IDP 20 may examine each of the sub-packets of the outer packet separately by extracting the sub-packets and reconstituting corresponding individual packet flows for internal processing only. IDP 20 retrieves one of the sub-packets from the outer packet (132). IDP 20 then determines whether the retrieved sub-packet is malicious or belongs to a network session that was previously determined to be malicious (134).

Initially, IDP 20 may retrieve an identifier for the sub-packet. The identifier may be, for example, the five-tuple of the outer packet and the five-tuple of the sub-packet. When IDP 20 has already recorded that the network session corresponding to the five-tuple of the outer packet and the five-tuple of the sub-packet is a malicious network session, IDP 20 determines that the sub-packet is a malicious sub-packet. To determine whether the sub-packet is malicious when IDP 20 has not previously determined that the corresponding network session is malicious, IDP 20 applies protocol decoders 30 to the sub-packet, possibly using application-layer data from the surrounding sub-packets of the encapsulated packet flow, and uses attack detection module 52 to determine whether the buffered set of surrounding sub-packets matches an attack signature and, therefore, represents an attack, as described above.

When IDP 20 determines that the sub-packet is malicious ("YES" branch of 134), IDP 20 applies one of policies 70 to the sub-packet (138). The one of policies 70 may be determined based on a protocol for the sub-packet. For example, when the sub-packet conforms to TCP, the policy may specify sending a close session message to a sender of the sub-packet. Therefore, IDP 20 may construct a close session message using the five-tuple of the sub-packet, encapsulate the close session message in an outer packet based on the five-tuple of the outer packet that originally encapsulated the sub-packet, and send the constructed outer packet to a destination specified by the five-tuple of the outer packet. As one example, IDP 20 may encapsulate an RST packet (a TCP reset packet) and send the encapsulated RST packet to the sender of the sub-packet. In particular, the RST packet will ultimately only reach the sender of the malicious packet, thus closing only the malicious inner session, whereas other inner sessions for the same outer session that are not determined to be malicious will not be affected. In this manner, when a gateway or other network device receives the outer packet, the gateway may decapsulate the close session message from the outer packet and send the close session message to the device that originally sent the malicious sub-packet. Upon receiving the close session message, the device may close the network session. In another example, the sub-packet may correspond to UDP, in which case the policy may specify dropping the packet.

When IDP 20 determines that the sub-packet is not malicious ("NO" branch of 134), IDP 20 adds the sub-packet to a reconstructed outer packet (136). In one example, IDP 20 may remove malicious sub-packets from the original outer packet and leave non-malicious sub-packets in the outer packet. In any case, when a sub-packet is not determined to be malicious, IDP 20 includes the sub-packet in a packet to be forwarded.

IDP 20 then determines whether the sub-packet is the last sub-packet of the outer packet (140). When more sub-packets are present in the outer packet ("NO" branch of 140), IDP 20 retrieves the next sub-packet (132) and determines whether the retrieved sub-packet is malicious (134).

After IDP 20 has inspected each of the sub-packets of the outer packet ("YES" branch of 140), IDP 20 constructs a header for the reconstructed packet, i.e., the packet including only sub-packets determined not to be malicious (142). In general, IDP 20 may use information from the original packet header of the outer packet. For packets that include a set of cyclical redundancy check (CRC) bytes in the packet header or other authentication hash, IDP 20 may need to recalculate the CRC bytes, e.g., when IDP 20 has removed one or more of the sub-packets from the outer packet. Some packet headers may also identify a number and/or location of sub-packets in the outer packet, which IDP 20 may reset or establish after IDP 20 removes one or more of the sub-packets corresponding to malicious network sessions. Information such as the source IP address, destination IP address, source port, destination port, and protocol, however, may remain the same in the reconstructed packet. IDP 20 then forwards the reconstructed packet using forwarding component 31 (144).

Figure 7:
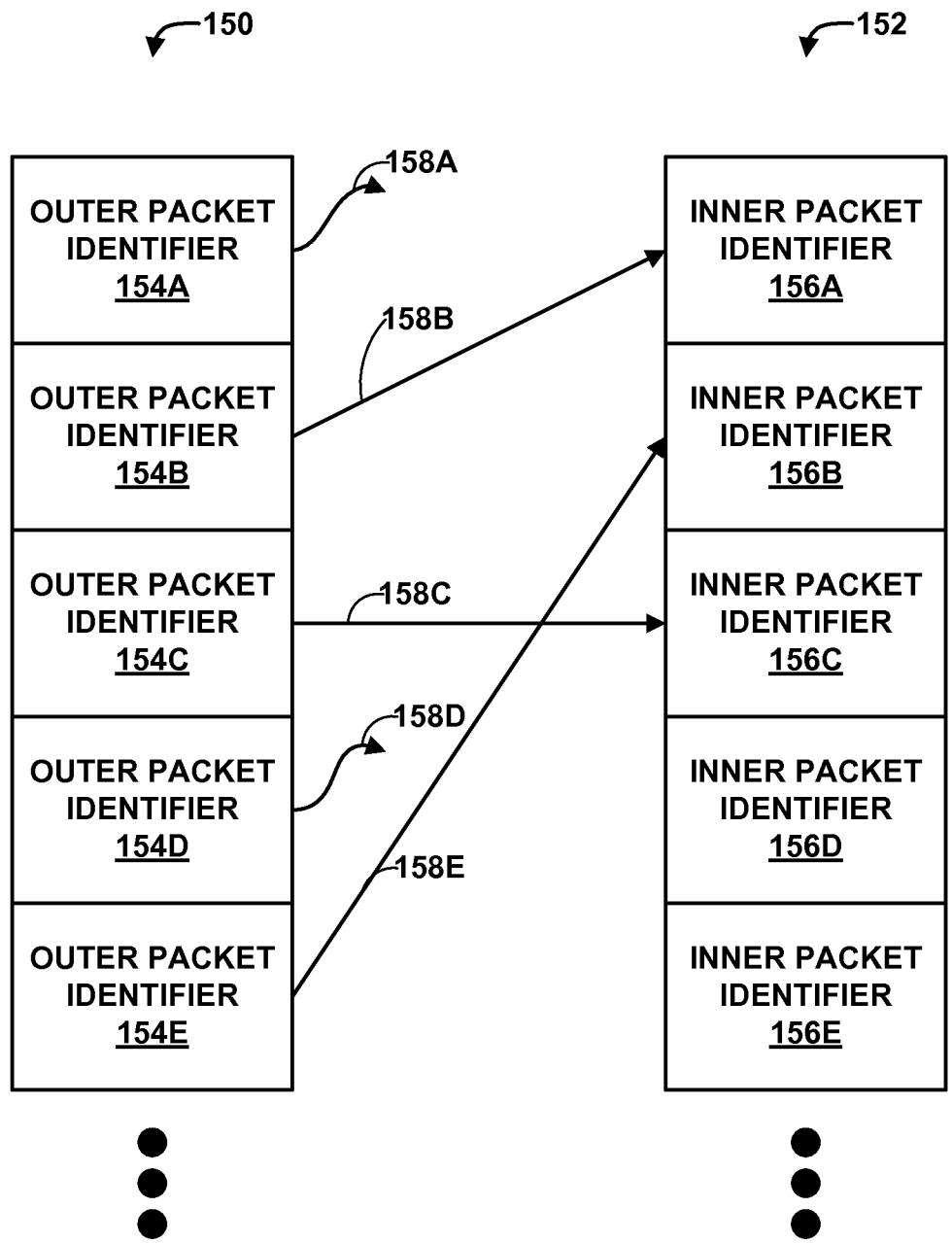
FIG. 7 is a conceptual diagram of example data structures for tracking a plurality of packet flows in network traffic where certain packet flows may be encapsulated.

FIG. 7 is a conceptual diagram of example data structures for tracking a plurality of packet flows in network traffic where certain packet flows may be encapsulated. FIG. 7 includes two hash tables 150, 152, which may correspond to flow table 35 (FIG. 2). Entries in hash table 150 correspond to non-encapsulating packet flows and outer packet flows for encapsulating packet flows, i.e., outer packet identifiers 154A-154E (outer packet identifiers 154). Entries in hash table 152 correspond to encapsulated packet flows within an outer packet flow, i.e., inner packet identifiers 156A-156E (inner packet identifiers 156).

Pointers 158A-158E (pointers 158) differentiate between regular, non-encapsulating outer packets and outer packets that encapsulate sub-packets. In particular, entries in hash table 150 whose corresponding one of pointers 158 point to an entry of hash table 152 identify packet flows that encapsulate another packet flow. In particular, the packet flow identified by the one of outer packet identifiers 154 encapsulates the packet flow identified by the one of inner packet flow identifiers 156 to which the corresponding one of pointers 158 points. When one of pointers 158 is null, i.e., does not point to an entry of hash table 152, the packet flow corresponding to the one of outer packet identifiers 154 is a non-encapsulating packet flow. In one example, when an outer packet flow encapsulates a plurality of inner packet flows, hash table 150 may include a plurality of entries with the same outer packet identifier, but with a pointer that points to a different one of inner packet identifiers 156. In another example, one of outer packet identifiers 154 may include a plurality of pointers when the packet flow encapsulates a plurality of inner packet flows.

In the example of FIG. 7, pointer 158A of outer packet identifier 154A and pointer 158D of outer packet identifier 154D are each null pointers. That is, pointers 158A, 158D do not point to an entry of hash table 152. Therefore, the packet flows corresponding to outer packet identifier 154A and 154D comprise packet flows that do not encapsulate a packet flow. Pointer 158B of outer packet identifier 154B points to inner packet identifier 156A, therefore the packet flow corresponding to outer packet identifier 154B encapsulates the packet flow corresponding to inner packet identifier 156A. Pointer 158C of outer packet identifier 154C points to inner packet identifier 156C, therefore the packet flow corresponding to outer packet identifier 154C encapsulates the packet flow corresponding to inner packet identifier 156C. Pointer 158E of outer packet identifier 154E points to inner packet identifier 156B, therefore the packet flow corresponding to outer packet identifier 154E encapsulates the packet flow corresponding to inner packet identifier 156B.

Figure 8:
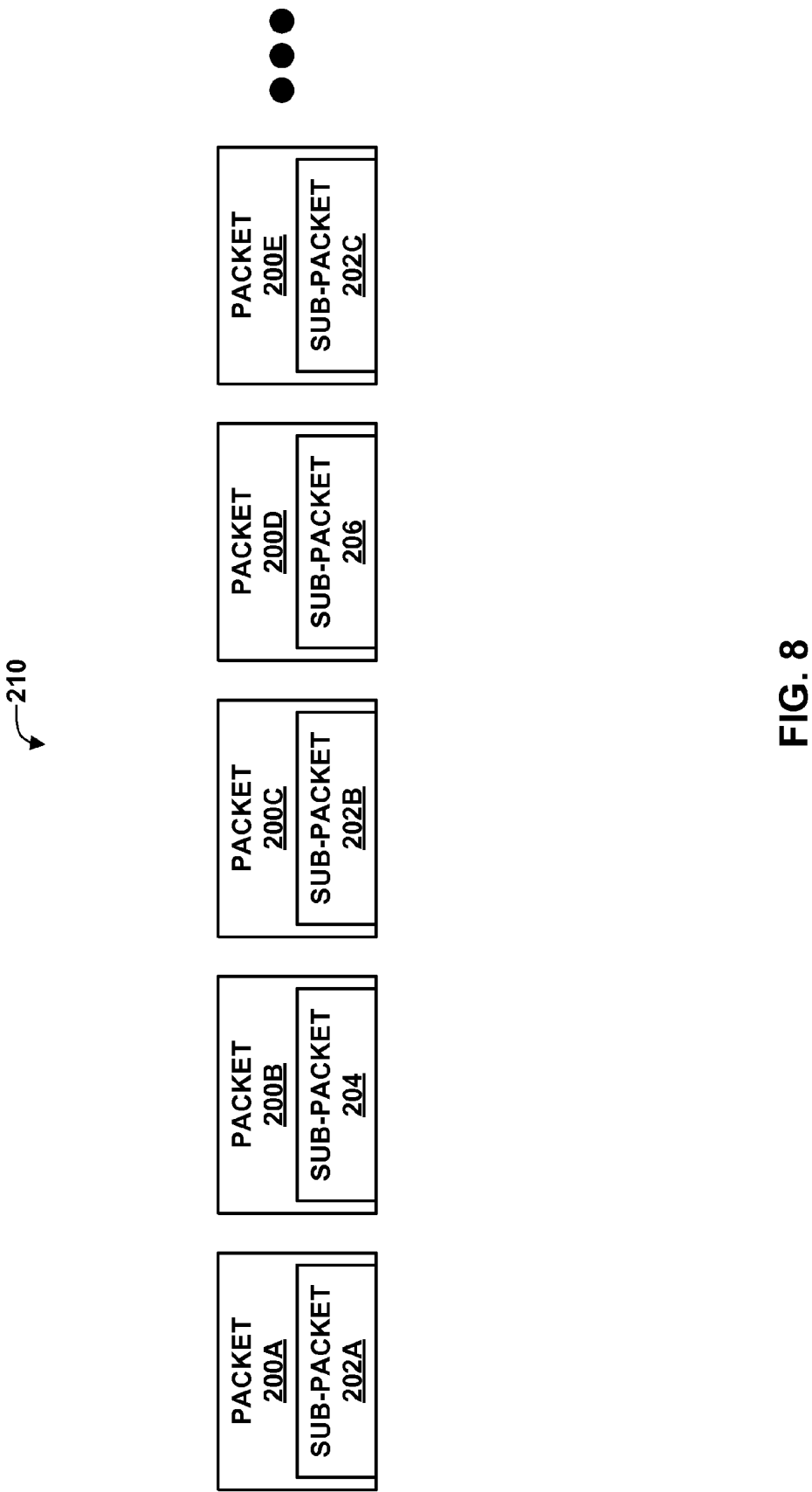
FIG. 8 is a conceptual diagram illustrating a packet flow comprising packets that encapsulate sub-packets of interior packet flows.

FIG. 8 is a conceptual diagram illustrating packet flow 210 comprising packets 200A-200E (packets 200). Packet 200A encapsulates sub-packet 202A, packet 200B encapsulates sub-packet 204, packet 200C encapsulates sub-packet 202B, packet 200D encapsulates sub-packet 206, and packet 200E encapsulates sub-packet 202C. Each of sub-packets 202A-202C (sub-packets 202) correspond to the same inner, i.e., encapsulated, packet flow. IDP 20 (FIGS. 2 & 3) may receive packet flow 210 and inspect packets 200 to detect network attacks within packet flow 210. For example, IDP 20 may determine that sub-packets 202 correspond to a malicious network session. IDP 20 may, for example, determine that sub-packet 202B is malicious. IDP 20 may buffer packet flow 210 in data buffer 55. After determining that an encapsulated packet flow of packet flow 210 is malicious, IDP 20 may save a snapshot of packet flow 210 or of the network session in which the malicious encapsulated packet flow was identified.

A user, such as administrator 42, may request to see data from malicious sub-packets or packets comprising malicious sub-packets, such as, for example, source/destination IP addresses, source/destination port numbers, protocols, identified applications, other encapsulated traffic, statistics related to the traffic, or other data. Administrator 42 may specifically request a configurable number of outer packets or inner packets before and/or after a packet in which a network attack was detected. When administrator 42 requests, for example, one outer packet both before and after the packet comprising the sub-packet identified as malicious, IDP 20 presents packets 200B, 200C, and 200D. When administrator 42 requests, as another example, one inner packet both before and after the sub-packet identified as malicious, IDP 20 presents sub-packets 202A, 202B, and 202C. In some examples, IDP 20 may also present packets 200A, 200C, and 200E in response to a request for one packet in each direction that comprises sub-packets of the packet flow identified as malicious. In this manner, IDP 20 may provide either or both of a snapshot of packet flow 210 or a snapshot of the network session around the time at which a malicious network session was identified. IDP 20 may therefore provide contextual information regarding network traffic when IDP 20 detected the malicious network session both for the outer packet flow and for the inner packet flow.

The techniques described herein may readily be applied to situations involving multiple layers of encapsulation. For example, a data structure similar to that of FIG. 8 may be employed to track N-layered encapsulation. A hash table may exist for each layer of encapsulation, with pointers from elements at a higher layer to elements at the lower layer to represent the next lower layer of encapsulation. Likewise, a null pointer may represent the end of encapsulation, i.e., that no lower-layer of encapsulation exists for the particular packet flow.

The techniques described herein may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
receiving, with an intrusion prevention device, a packet of a packet flow, the packet comprising a packet header and a plurality of sub-packets encapsulated within a payload of the packet, each of the plurality of sub-packets corresponding to respective encapsulated network sessions, wherein the intrusion prevention device is positioned between a source of the packet and a destination for the packet;
analyzing, with the intrusion prevention device, each of the plurality of sub-packets encapsulated within the packet;
identifying, with the intrusion prevention device, one of the encapsulated network sessions as a malicious encapsulated network session based on the analysis of the plurality of sub-packets;
executing, with the intrusion prevention device, a targeted policy action on the one of the sub-packets corresponding to the malicious encapsulated network session based on the identification of the encapsulated network session as a malicious encapsulated network session;
forming, with the intrusion prevention device, a reconstructed packet comprising the packet header and the plurality of sub-packets excluding at least the sub-packet corresponding to the malicious encapsulated network session; and
forwarding the reconstructed packet with the intrusion prevention device.

2. The method of claim 1, further comprising recording an identifier of the malicious encapsulated network session as an entry in a session table.

3. The method of claim 2, wherein the packet comprises a first packet, wherein the plurality of sub-packets comprises a first plurality of sub-packets, and wherein the reconstructed packet comprises a first reconstructed packet, the method further comprising:
receiving a second packet of the packet flow, the second packet comprising a second plurality of sub-packets each corresponding to respective encapsulated network sessions;
performing a lookup in the session table for each of the second plurality of sub-packets;
determining that an encapsulated network session for one of the second plurality of sub-packets matches the identifier of the malicious encapsulated network session in the session table;
and
forming a second reconstructed packet comprising the at least one of the second plurality of sub-packets whose identifier does not correspond to any of the identifiers of malicious encapsulated network sessions in the session table and forwarding the second reconstructed packet.

4. The method of claim 2,
wherein analyzing each of the first plurality of sub-packets comprises:
- identifying a first five-tuple for the packet flow, the first five-tuple comprising a source internet protocol (IP) address, a destination IP address, a source port, a destination port, and a protocol; and
- identifying a second five-tuple for the malicious encapsulated network session from the sub-packet corresponding to the malicious encapsulated network session;

wherein executing a targeted policy action comprises executing the targeted policy action based on the combination of the first five-tuple and the second five-tuple; and wherein recording the identifier comprises recording the first five-tuple and the second five-tuple as the identifier.

5. The method of claim 4, further comprising constructing a virtual packet header for the sub-packet of the malicious encapsulated network session, wherein identifying the second five-tuple comprises identifying the second five-tuple from the virtual packet header.

6. The method of claim 1, wherein executing a policy action comprises dropping the sub-packet corresponding to the malicious encapsulated network session.

7. The method of claim 1, wherein executing a policy action comprises sending a close session message to at least one of a server of the malicious encapsulated network session and a client of the malicious encapsulated network session.

8. The method of claim 7, wherein sending a close session message comprises generating a packet that encapsulates the close session message and sending the generated packet.

9. The method of claim 1, wherein the packet comprises a first packet and wherein the reconstructed packet comprises a first reconstructed packet, the method further comprising:
- receiving a second packet of the packet flow, the second packet comprising a second plurality of sub-packets;
- determining that one of the second plurality of sub-packets belongs to the malicious encapsulated network session; and
- forming a second reconstructed packet comprising the second plurality of sub-packets excluding the one of the second plurality of sub-packets that belongs to the malicious encapsulated network session and forwarding the second reconstructed packet.

10. The method of claim 9, further comprising executing a second policy action on the one of the second plurality of sub-packets that belongs to the malicious encapsulated network session.

11. The method of claim 10, wherein the second policy action executed on the one of the second set of one or more sub-packets is the same as the policy action executed on the sub-packet of the plurality of sub-packets of the first packet corresponding to the malicious encapsulated network session.

12. A network device comprising:
- a memory storing instructions for a flow analysis module, an attack detection module, and a policy action module;
- a processor configured to execute the instructions, wherein the processor executes the instructions for the flow analysis module to receive a packet of a packet flow, the packet comprising a packet header and one or more sub-packets each corresponding to respective encapsulated network sessions;

wherein the processor executes the instructions for the attack detection module to analyze the one or more sub-packets and to identify at least one of the encapsulated network sessions as a malicious encapsulated network session based on the analysis;

wherein the processor executes the instructions for the policy action module to execute a policy action on the sub-packet corresponding to the malicious encapsulated network session based on the identification of the malicious encapsulated network session; and a forwarding component configured to form a reconstructed packet comprising the packet header and the plurality of sub-packets excluding the sub-packet corresponding to the malicious encapsulated network session and forward the reconstructed packet.

13. The device of claim 12, further comprising a flow table configured to store an identifier for the packet flow.

14. The device of claim 13, wherein the flow table comprises a first hash table and a second hash table, wherein the first hash table is configured to store the identifier for the packet flow, and wherein the second hash table is configured to store identifiers for the encapsulated network sessions, the flow table further comprising a pointer from the identifier in the first hash table to at least one of the identifiers of the second hash table.

15. The device of claim 14, wherein the identifier stored in the first hash table comprises a first five-tuple for the packet flow, the first five-tuple comprising a source internet protocol (IP) address, a destination IP address, a source port, a destination port, and a protocol, wherein the at least one identifier of the second hash table comprises a second five-tuple for the malicious encapsulated network session from the sub-packet corresponding to the malicious encapsulated network session.

16. The device of claim 12, wherein the processor executes the policy action module to drop the sub-packet corresponding to the malicious encapsulated network session.

17. The device of claim 12, wherein the processor executes the policy action module to construct an encapsulated close session message and cause the forwarding component to send the close session message to at least one of a server of the malicious encapsulated network session and a client of the malicious encapsulated network session.

18. The device of claim 12, wherein the processor executes the attack detection module to inspect both encapsulated packet flows and non-encapsulated packet flows.

19. A system comprising:
- a tunnel termination device configured to receive a packet flow from a network, wherein the packet flow comprises one or more encapsulated network sessions, wherein the tunnel termination device decapsulates the packet flow and forwards decapsulated data from the decapsulated packet flow;
- a network device configured to receive at least a portion of the decapsulated data from the tunnel termination device;
- an intrusion detection device upstream from the tunnel termination device, wherein the intrusion detection device is configured to:
  - receive a packet of the packet flow, the packet comprising a packet header and one or more sub-packets each corresponding to respective ones of the encapsulated network sessions;
  - identify at least one of the encapsulated network sessions as a malicious encapsulated network session;
  - execute a policy action on the sub-packet corresponding to the malicious encapsulated network session based on the identification of the malicious encapsulated network session; and form a reconstructed packet comprising the packet header and the one or more sub-packets excluding the sub-packet corresponding to the malicious encapsulated network session and forward the reconstructed packet to the tunnel termination device.

20. The system of claim 19, wherein the intrusion detection device further comprises a flow table configured to store an identifier for the packet flow.

21. The system of claim 20, wherein the flow table of the intrusion detection device comprises a first hash table and a second hash table, wherein the first hash table is configured to store the identifier for the packet flow, and wherein the second hash table is configured to store identifiers for the encapsulated network sessions, the flow table further comprising a pointer from the identifier in the first hash table to at least one of the identifiers of the second hash table.

22. The system of claim 21, wherein the identifier stored in the first hash table comprises a first five-tuple for the packet flow, the first five-tuple comprising a source internet protocol (IP) address, a destination IP address, a source port, a destination port, and a protocol, wherein the at least one identifier of the second hash table comprises a second five-tuple for the malicious encapsulated network session from the sub-packet corresponding to the malicious encapsulated network session.

23. The system of claim 19, wherein intrusion detection device is configured to drop the sub-packet corresponding to the malicious encapsulated network session.

24. The system of claim 19, wherein the intrusion detection device is configured to construct an encapsulated close session message and configured to cause the forwarding component to send the close session message to at least one of a server of the malicious encapsulated network session and a client of the malicious encapsulated network session.

25. A non-transitory computer-readable medium encoded with instructions for causing a programmable processor of an intrusion prevention device to:
receive, with the intrusion prevention device, a packet of a packet flow, the packet comprising a packet header and a one or more sub-packets encapsulated within a payload of the packet, each of the one or more sub-packets corresponding to respective encapsulated network sessions, wherein the intrusion prevention device is positioned between a source of the packet and a destination for the packet;
identify, with the intrusion prevention device, at least one of the encapsulated network sessions as a malicious encapsulated network session;
execute, with the intrusion prevention device, a policy action on the sub-packet corresponding to the malicious encapsulated network session based on the identification of the malicious encapsulated network session; and
form, with the intrusion prevention device, a reconstructed packet comprising the packet header and the one or more sub-packets excluding the sub-packet corresponding to the malicious encapsulated network session and forward the reconstructed packet with the intrusion prevention device.

26. The non-transitory computer-readable medium of claim 25, further encoded with instructions to record an identifier of the malicious encapsulated network session as an entry in a session table.

27. The non-transitory computer-readable medium of claim 26, wherein the instructions to record an identifier comprise instructions to:
identify a first five-tuple for the packet flow, the first five-tuple comprising a source internet protocol (IP) address, a destination IP address, a source port, a destination port, and a protocol;
identify a second five-tuple for the malicious encapsulated network session from the sub-packet corresponding to the malicious encapsulated network session; and
record the first five-tuple and the second five-tuple as the identifier.

28. The non-transitory computer-readable medium of claim 25, wherein the instructions to execute a policy action comprise instructions to drop the sub-packet corresponding to the malicious encapsulated network session.

29. The non-transitory computer-readable medium of claim 25, wherein the instructions to execute a policy action comprise instructions to generate a packet that encapsulates a close session message and send the generated packet to at least one of a server of the malicious encapsulated network session and a client of the malicious encapsulated network session.

30. The non-transitory computer-readable medium of claim 25, wherein the packet comprises a first packet and wherein the reconstructed packet comprises a first reconstructed packet, the computer-readable medium further encoded with instructions to:
receive a second packet of the packet flow, the second packet comprising a second set of one or more sub-packets;
determine that one of the second set of one or more sub-packets belongs to the malicious encapsulated network session; and
form a second reconstructed packet comprising the second plurality of sub-packets excluding the one of the second plurality of sub-packets that belongs to the malicious encapsulated network session and forward the second reconstructed packet.

* * * * *